US012436861B2

(12) United States Patent
Jones

(10) Patent No.: US 12,436,861 B2
(45) Date of Patent: Oct. 7, 2025

(54) CONTENT ANALYSIS AND SCORING SYSTEM AND METHOD

(71) Applicant: Colleen Pettit Jones, Atlanta, GA (US)

(72) Inventor: Colleen Pettit Jones, Atlanta, GA (US)

( * ) Notice: Subject to any disclaimer, the term of this patent is extended or adjusted under 35 U.S.C. 154(b) by 0 days.

(21) Appl. No.: 16/545,379

(22) Filed: Aug. 20, 2019

(65) Prior Publication Data

US 2020/0050527 A1 Feb. 13, 2020

Related U.S. Application Data

(63) Continuation-in-part of application No. 14/478,708, filed on Sep. 5, 2014, now Pat. No. 10,387,526.

(60) Provisional application No. 61/874,334, filed on Sep. 5, 2013.

(51) Int. Cl.
| | |
|---|---|
| *G06F 11/34* | (2006.01) |
| *G06F 3/0482* | (2013.01) |
| *G06F 3/0483* | (2013.01) |
| *G06F 17/18* | (2006.01) |

(52) U.S. Cl.
CPC ........ *G06F 11/3438* (2013.01); *G06F 3/0482* (2013.01); *G06F 3/0483* (2013.01); *G06F 17/18* (2013.01)

(58) Field of Classification Search
CPC .. G06F 11/3438; G06F 3/0482; G06F 3/0483; G06F 17/18; G06F 2201/875; H04L 67/22; G06Q 30/0203
USPC ........................................................ 707/748
See application file for complete search history.

(56) References Cited

U.S. PATENT DOCUMENTS

| | | | | |
|---|---|---|---|---|
| 7,133,834 B1 * | 11/2006 | Abelow | ............ | G06Q 30/0245 705/1.1 |
| 2004/0167828 A1 * | 8/2004 | Bria, Jr. | ............. | G06Q 30/0613 705/26.1 |
| 2006/0031115 A1 * | 2/2006 | Eisma | ............ | G06Q 10/063112 705/7.14 |
| 2007/0067297 A1 * | 3/2007 | Kublickis | .............. | G06Q 30/02 707/999.009 |
| 2007/0192166 A1 * | 8/2007 | Van Luchene | ...... | G06F 16/3325 705/14.54 |
| 2008/0201373 A1 * | 8/2008 | Ahn | ....................... | G06F 16/951 |
| 2010/0049608 A1 * | 2/2010 | Grossman | .......... | G06Q 30/0267 705/14.55 |
| 2010/0131356 A1 * | 5/2010 | Stevens | .................. | G06Q 30/02 705/14.44 |
| 2011/0276396 A1 * | 11/2011 | Rathod | ............... | G06F 16/2428 707/706 |
| 2012/0158514 A1 * | 6/2012 | Aldrey | ............... | G06Q 30/0631 705/14.66 |

(Continued)

*Primary Examiner* — Hicham Skhoun
(74) *Attorney, Agent, or Firm* — Wayne Edward Ramage; Baker Donelson

(57) ABSTRACT

A system and related methods for analyzing and generating a score for web sites containing content, and providing recommendations and guidance for content modifications and additions. The system provides and receives content survey results from users or viewers of a site, aggregates the content survey results, integrates metrics for multiple content types and domains, and generates a content score for each content type and domain. A summary or aggregate score based upon the scores for each content type and domain also is calculated. The scores can be presented or displayed in a dashboard, graphic interface, report, or other means.

10 Claims, 24 Drawing Sheets

(56) References Cited

U.S. PATENT DOCUMENTS

| | | | |
|---|---|---|---|
| 2012/0191815 A1* | 7/2012 | Tabbal | G06Q 30/0269 709/218 |
| 2013/0046582 A1* | 2/2013 | Ramer | G06Q 10/101 705/7.32 |
| 2013/0311246 A1* | 11/2013 | Heber | G06Q 10/06395 705/7.41 |
| 2014/0032657 A1* | 1/2014 | Johnmar | G06Q 50/01 709/204 |

* cited by examiner

New Evaluation

Type

Name [_____]

○ Expertise Content  250
○ Sales Content
○ Technical Support Content
○ Customer Service Content

Recruitment URLs

○ Entire Domain  252
○ Subdomain only

[ Create Evaluation ]  254

DASHBOARD    Jane Smith    Example LOGO

QUESTIONS?
Have questions or need more assistance?
[ Contact Us ]

FIG. 8

| View by Priority | View by Category |

Download Recommendations

Top Ways to Improve

CONTENT DISCOVERY 310

You face opportunities to make your site easier to find, share, recommend, and remember your site as a source of excellent content.

☐ None of your users reported that an expert recommended your content to them. An expert recommendation immediately positions your content as authoritative and, as a result, increases the likelihood that your users will take it seriously. Explore ways to have more experts or influencers share, recommend, or promote your expertise content online and offline. Also check that you have easy-to-use tools for sharing content by email and by social media.

☐ None of your users reported discovering your content through a search engine. Check whether the words you use in your content and metadata match the words that your ideal users search for. Usually, to reach users in early stages of a decision or a buying process, your content should speak in terms of their problems, needs, or concerns—not in terms of your solution. To reach users in late stages of a decision or a buying process, your content should speak in terms of your solution—why it works and how it's different from competitors.

☐ None of your users reported remembering and returning to your content because of a good past experience. Explore ways to build user loyalty to your content such as offering email updates, RSS feeds, and regularly offering fresh, new content that gives users a reason to return.

FIG. 12

CONTENT ACCURACY    320

33% of your users reported that your content does not seem accurate. If the people you're trying to reach can't trust that your content is up-to-date, they will be less likely to trust you.

Many of your users/customers reported that they were not sure whether your content was accurate ☐ 33% of your users felt that your content provides conflicting or confusing messages. Review your content and correct contradictory statements. Also, review your content for statements that users might interpret as contradictory but really aren't. Make those statements clearer.

☐ 67% of your users felt that they could not verify whether the content really was accurate. Consider including references, citations, and evidence of key points in your content.

FIG. 13

Expertise Content Evaluation - Content Science

Evaluation in progress...

ContentWRX is currently evaluating your site's expertise content. Check back soon for initial results.

<< Return to dashboard

FIG. 15

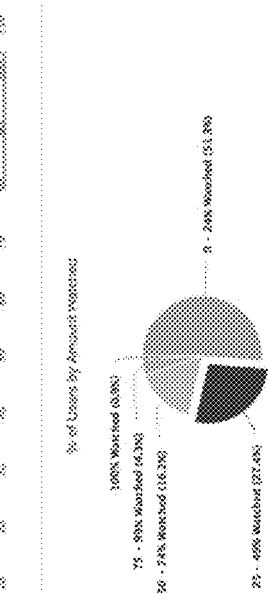
FIG. 24

CONTENT ANALYSIS AND SCORING SYSTEM AND METHOD

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates to a system and method for analyzing and generating a score for sites containing content, and providing recommendations and guidance for content modifications and additions.

BACKGROUND OF INVENTION

With the growth of the Internet, individuals and businesses have been creating and publishing webpages to interact with viewers in a variety of ways: provide information; collect information; advertise products; sell products; and the like. However, the effectiveness of a particular web site can vary greatly. Various search engine optimization (SEO) means are known in the art for tweaking or modifying text or pictures on a webpage, but such means are often problematic, and address the issue of a web site being found, not the issue of improving desired results from visitors to the web site.

SUMMARY OF INVENTION

In various embodiments, the present invention provides a system and related methods for analyzing and generating a score for web sites containing content, and providing recommendations and guidance for content modifications and additions.

In one exemplary embodiment, the system automatically generates a score for content at a web site. The process comprises providing and receiving content survey results from users or viewers of the site, aggregating the content survey results, integrating metrics for multiple content types and domains, generating a content score for each content type and domain, and generating a summary or aggregate score based upon the scores for each content type and domain. In one embodiment, the content score is generated by evaluating and scoring the various elements of content, and then applying a weighting factor, and summing. The summary or aggregate score can be a summation of the scores for each content type and domain (which may individually weighted as well), or it can be an average (weighted or otherwise). The scores can be presented or displayed in a dashboard, graphic interface, report, or other means.

In yet another exemplary embodiment, the system comprises providing content guidance and recommendations based on the content scores. The system can automatically select recommendations and guidance (e.g., curated research and best practices) based upon the scores and relative weightings. The recommendations and guidance can be displayed, printed, or other similar means.

BRIEF DESCRIPTION OF THE DRAWINGS

FIG. 8 shows an example of a new evaluation screen.

FIG. 12 shows an example of a content discovery improvements screen.

FIG. 13 shows an example of a content accuracy improvements screen.

FIG. 15 shows an example of an evaluation in progress screen.

FIG. 24 shows an example of another portion of an expertise evaluation detailed page/screen report.

DETAILED DESCRIPTION OF EXEMPLARY EMBODIMENTS

In various embodiments, the present invention provides a system and related methods for analyzing and generating a score for web sites containing content, and providing recommendations and guidance for content modifications and additions.

Figure 1:
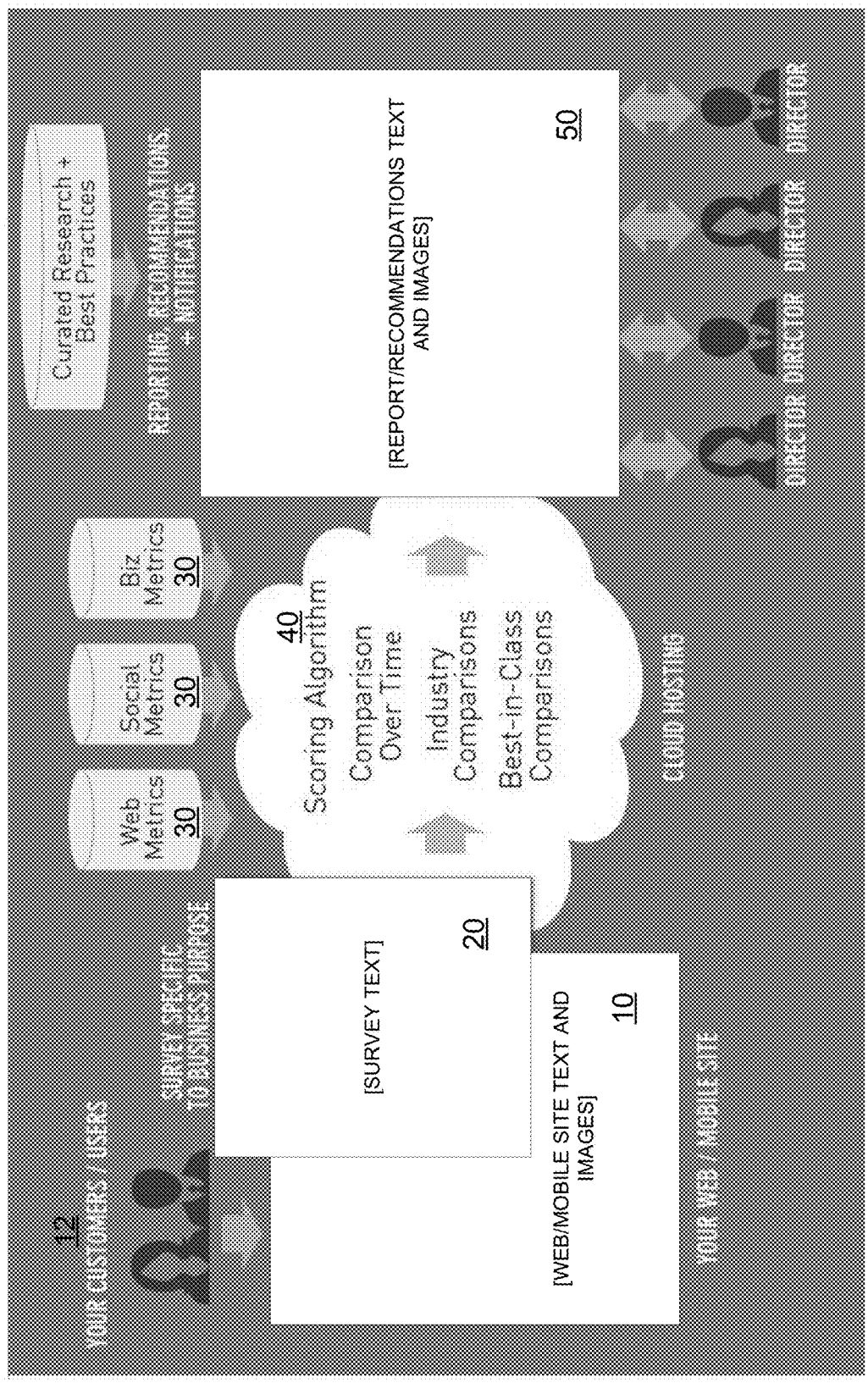
FIG. 1 shows a view of a system in accordance with an embodiment of the present invention.

In one exemplary embodiment, as seen in FIG. 1, the system automatically generates a score for content at a web site 10. The process comprises providing and receiving content survey results 20 from users or viewers 12 of the site, aggregating the content survey results, integrating Internet, social, and business metrics 30 for multiple content types and domains, generating a content score for each content type and domain using a scoring algorithm 40, and generating a summary or aggregate score 50 based upon the scores for each content type and domain.

In some embodiments, the content score is generated by evaluating and scoring the various elements of the content, applying a weighting factor for each element, and summing. The summary or aggregate score can be a summation of the scores for each content type and domain (which may individually weighted as well), or it can be an average (weighted or otherwise) of those scores. The scores can be presented or displayed in a dashboard, graphic interface, report, or other means.

In several embodiments, the score considers five elements of content effectiveness. Discovery/findability of the content is based upon whether and how user discover the content (e.g., through social media, Google or other search engines, recommendation, or the like). This also includes consideration of whether users can easily find content on the site once present, such as through site navigation, bookmarks, on-site search, and other methods. Accuracy and polish of the content determines to what extent the content seems accurate, correct and polished to users. Relevance of content determines whether the content seems pertinent to users' questions, needs, or tasks. Usefulness of the content determines whether the content seems helpful to users' needs or tasks, or answers users' questions. And finally, influence of content determines whether the content has the desired impact on user perception, decision, or action.

The score of the present invention is calculated by applying a weighting factor to each of the above elements. The weighting may include consideration of the goal or purpose of the content. Thus, different weightings may be applied for different content type. For example, the weightings for sales content are different from weightings for technical support content. The user contact or survey invitation method also may be considered. For evaluations where the survey component is conducted through email instead of in context (i.e., when the user is actually using the website), the scoring adjusts to exclude part of the discovery weighting.

Figure 2:
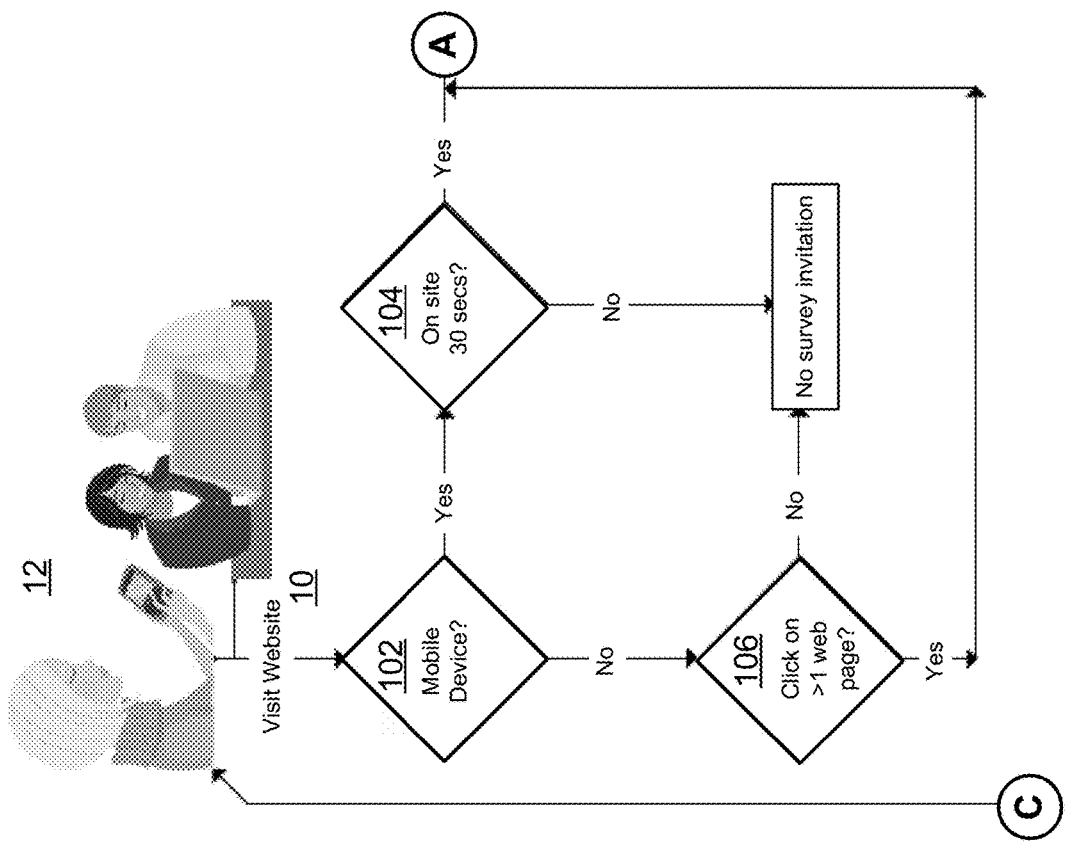
FIGS. 2-4 show a diagram of user interaction with a web site.
Figure 3:
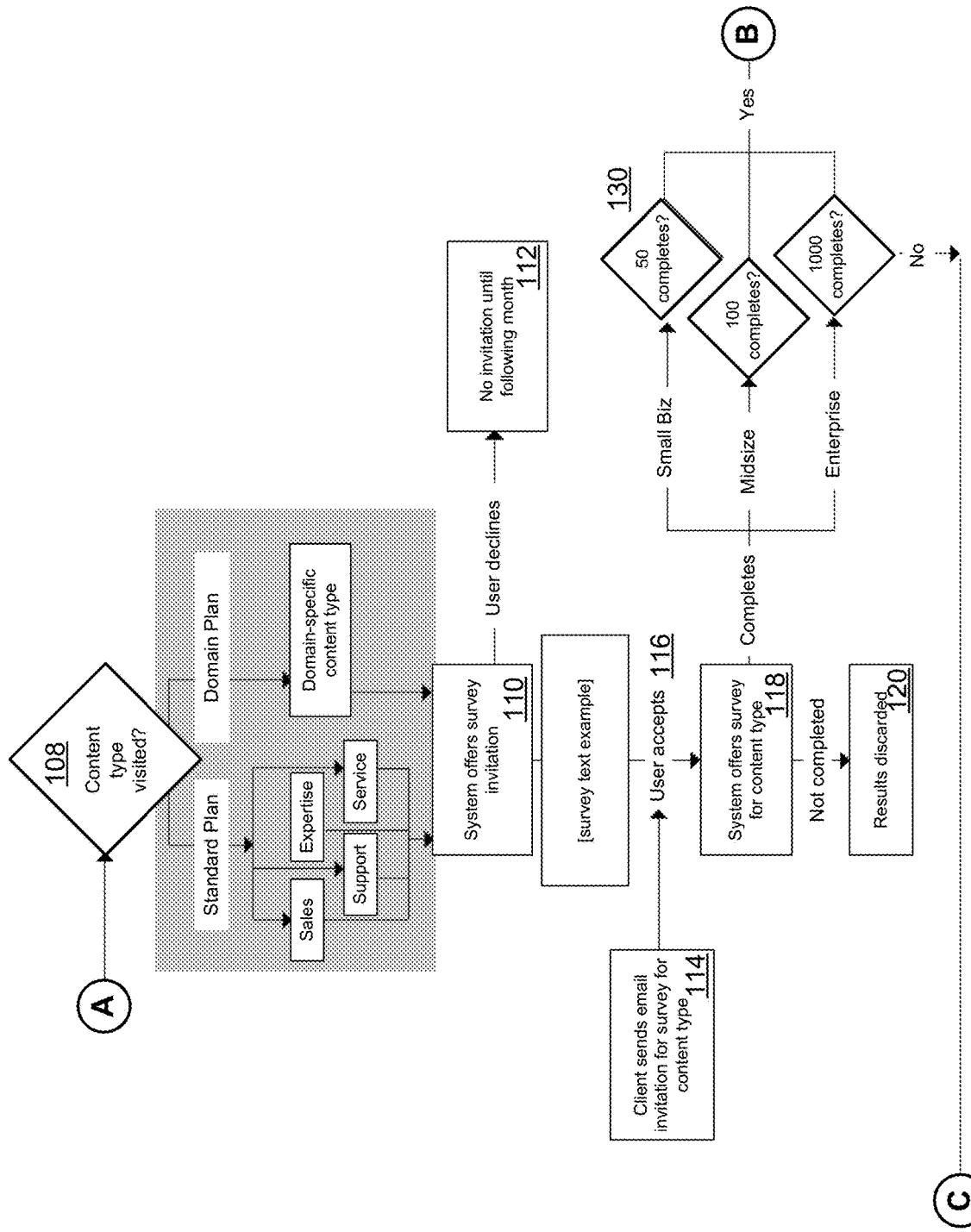
Figure 4:
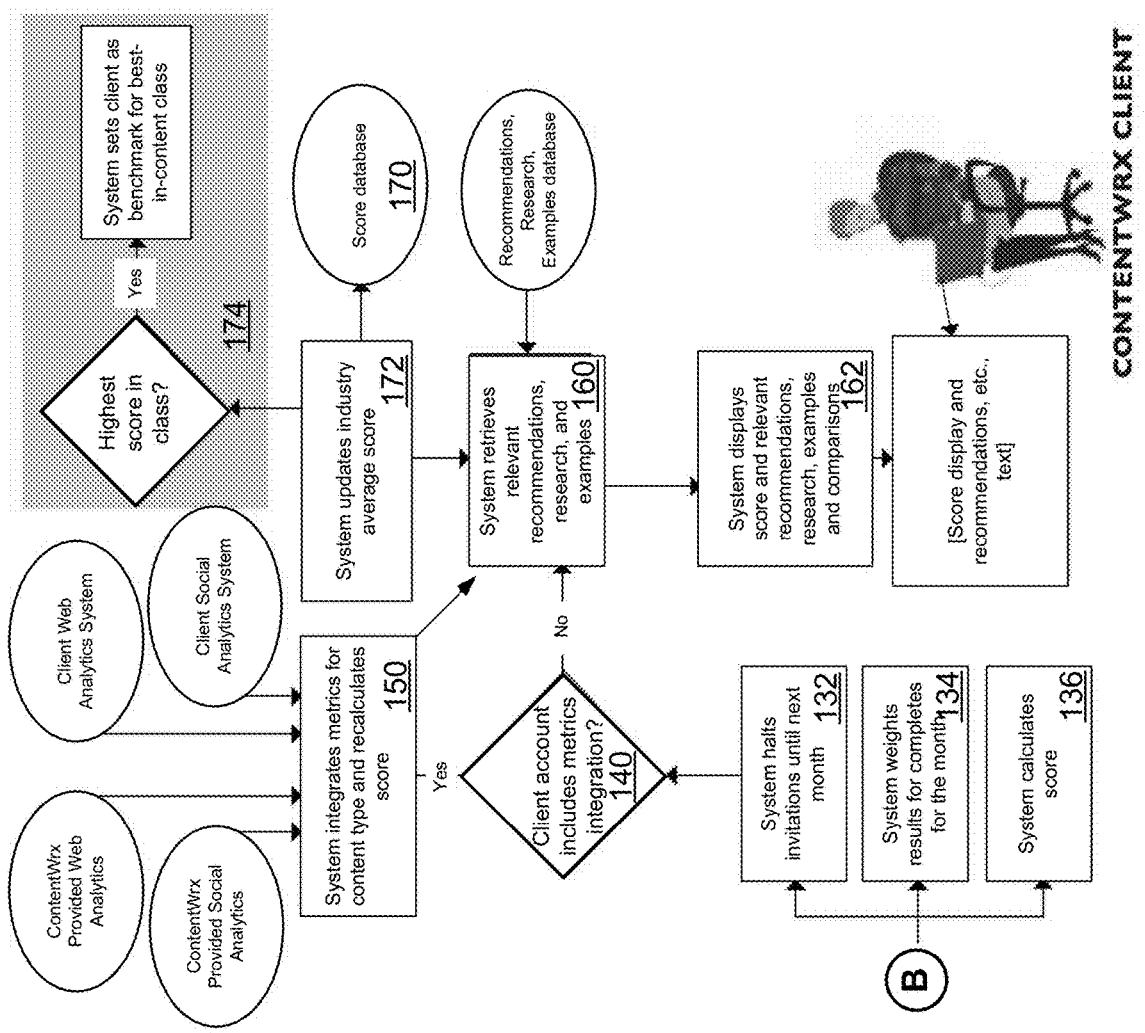

In one exemplary embodiment, as seen in FIGS. 2-4, users 12 visit the web site 10. The system then uses a variety of triggers determines whether to continue monitoring the user interaction and extend them an invitation to participate in the survey (either in real time while the user is on the web site, or via email). The system determines whether the user is accessing the website with a mobile device 102. If yes, and the user is onsite for 30 seconds or more 104, the process continues If no, the system determines whether the user has clicked on the web page 106. If yes, the process continues. The system then determines the type of content visited 108. Under a "standard plan," the content type is divided into sales, expertise, support, and service. Under a "domain plan," the content type is domain specific.

At this point, the system extends an survey invitation 110 to the user. If the user declines, the system notes this, and will not invite that particular user to participate in the survey for a period of time (e.g., a month) 112. Alternatively, invitations to participate in a survey for particular content type can be sent to users via email 114. Upon acceptance 116, the system offers the appropriate survey for that content type 118. If the user does not complete the survey, the survey results are discarded 120. The surveys ask for user impressions and responses to various elements of the website, and include questions focusing on specific elements of the content relevant to the scoring, as described above.

If completed, the survey results are collected by the system. The system continues to collect survey results (by the process described above) until a certain threshold for a time period (e.g., month) is achieved 130. This threshold may vary based on site traffic, or on the size or nature of the web site or business. For example, a small business may have a threshold of 50, a midsized business may have a threshold of 100, and a large sized or enterprise business may have a threshold of 1000.

When the survey threshold has been reached, the system halts invitations for the time period 132. The system them weights the content survey results 134 as described above, and calculates a content score for the web site for the month 136.

The system then determines if the client (i.e., owner of the web site) also desires or has asked for metrics to be integrated 140. If so, the system then integrates appropriate metrics for the content type, and recalculates the content score 150. Metrics may include, but are not limited to, system-provided web and social analytics, and client-provided web and social analytics. The system both collects and integrates analytics.

In several embodiments, analytics are factored into the "influence" element, as discussed above, particularly influence on user action. Different analytic measures are considered depending on content type. Thus, analytics that the system factors into scoring for thought leadership content are different than the analytics the system considers for sales content. For example, "conversions" (such as a user requesting information, adding a product to a cart, or actually buying a product) are weighted heavily for scoring sale content. The web site owner or operator (i.e., the client) also can define what a "conversion" is for their web site, or define similar factors for their applicable analytics.

Figure 16:
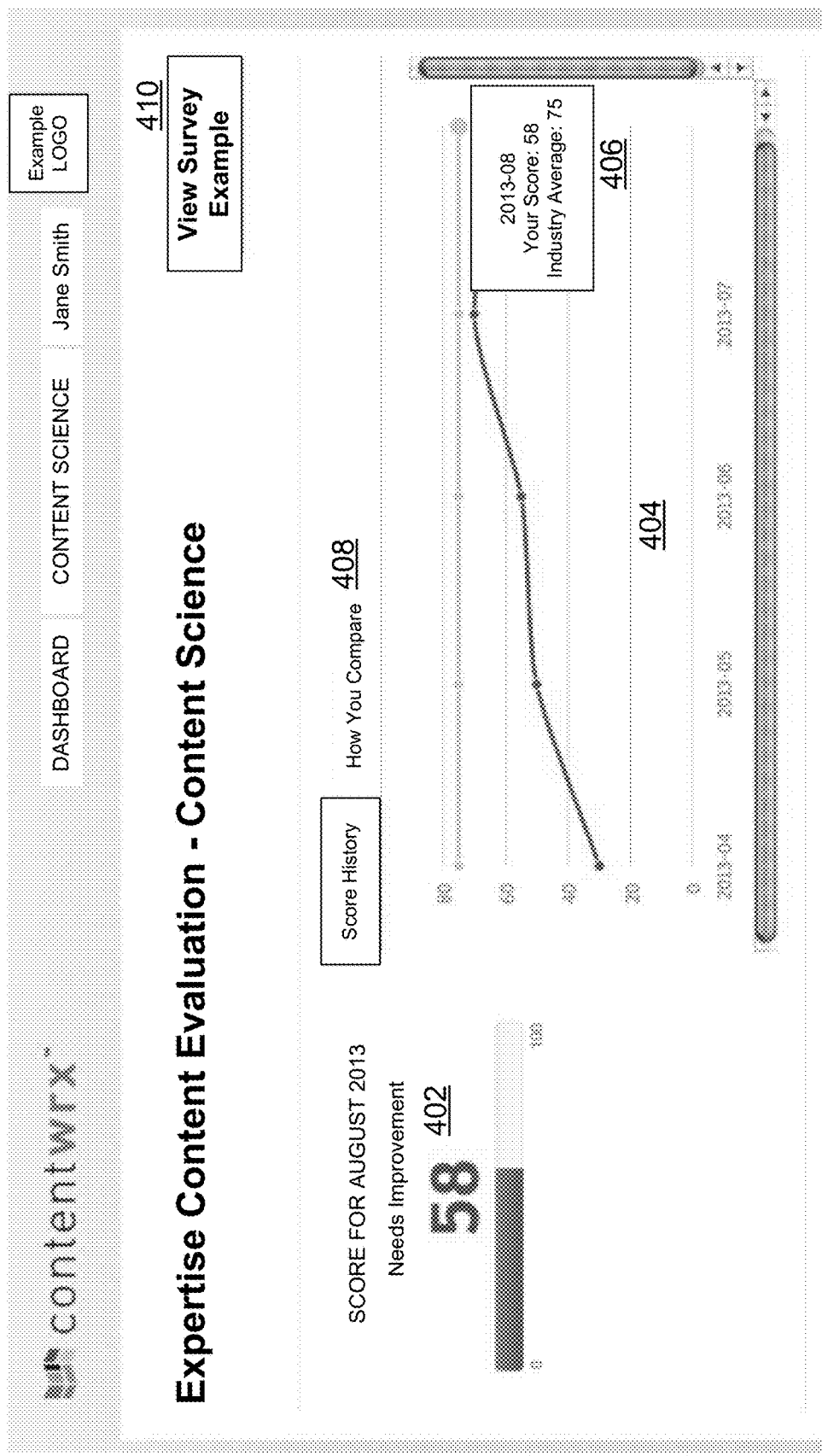
FIG. 16 shows an example of a content evaluation dashboard with score and score history.

The system then automatically selects and retrieves guidance relevant recommendations, research, and examples (e.g., curated research and best practices) based on the content type and score and relative weightings 160. The system can automatically select recommendations and guidance (e.g., curated research and best practices) based upon the scores and relative weightings. The recommendations and guidance can be displayed 162, printed, or other similar means. An example of such a display is shown in FIG. 16.

A user may also be able to see results, analysis, and recommendations prior to the threshold being reached for halting survey collections. In one embodiment, these may be provided when a certain percentage (e.g., 20%) of the threshold has been collected. Scores may be recalculated after every survey completion (i.e., in real time).

In several embodiments, the system also may maintain a score database 170 with scores for a variety of web sites, organized by type of content, type of industry or business, and other similar factors. The system updates the score database with the new score (from 136 or 150), and updates the appropriate industry average score 172. If the new score is the highest score for a particular class of content, the system sets the new score as the benchmark for "best-in-content" for that class 174.

Figure 5:
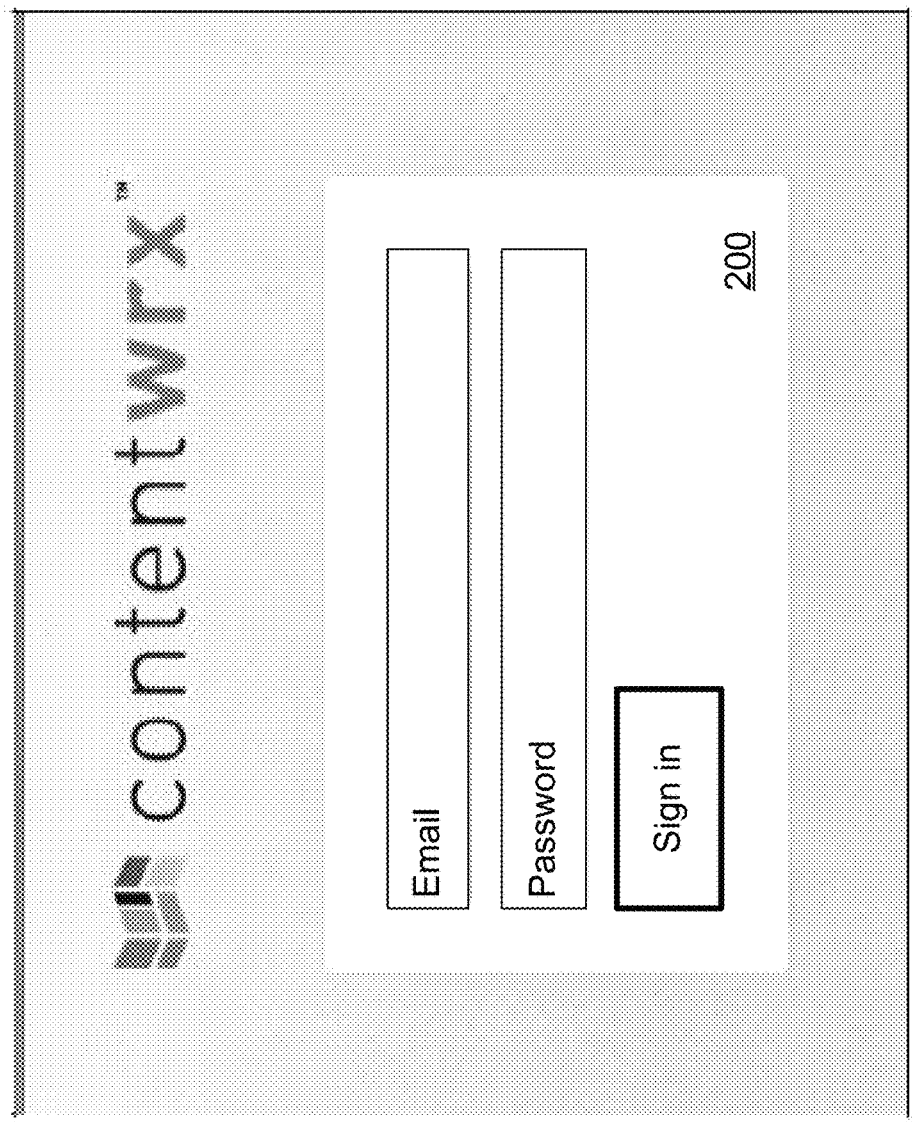
FIG. 5 shows an example of a log-in page.

The system allows a web site owner (or client user) to access the system to initiate surveys and content review, and review results. FIG. 5 shows an example of a log in screen 200, where a client user can sign in using an email and password. If a user is not registered, they can register separately.

Figure 6:
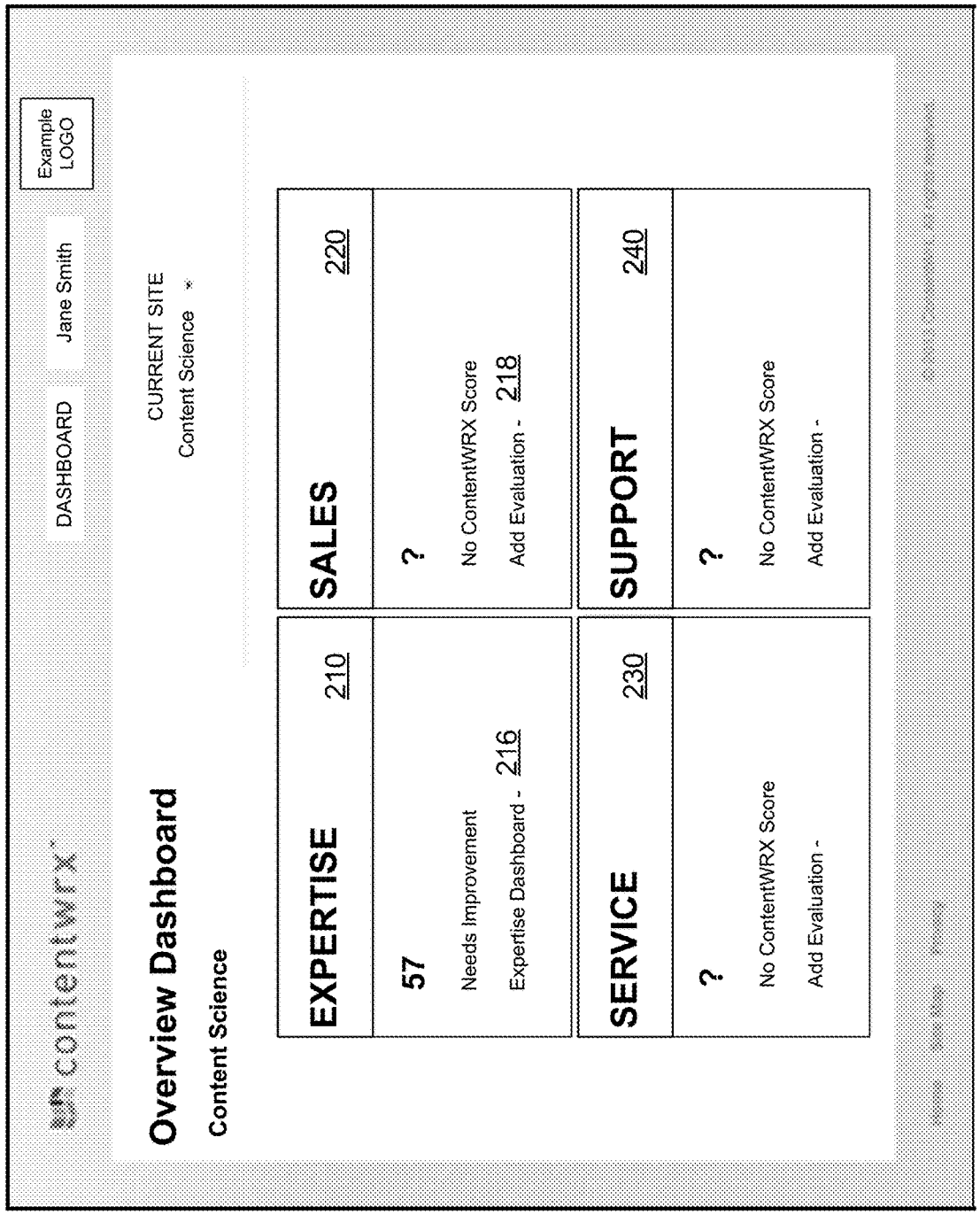
FIG. 6 shows an example of an overview dashboard screen.

Upon logging in, the user is directed to the overview dashboard (FIG. 6). In this example, the overview dashboard is for a business web site. From here, the user can select a content category for the type of content he or she desires to evaluate for a web site: expertise 210, sale 220, service 230, and support 240. Expertise content is related to information regarding thought leadership or advice for customer/client needs. Sales contents is related to guided sales of a product or service. Service content is related to customer service for a product or service. Support content is related to technical support for a product or service.

Figure 7:
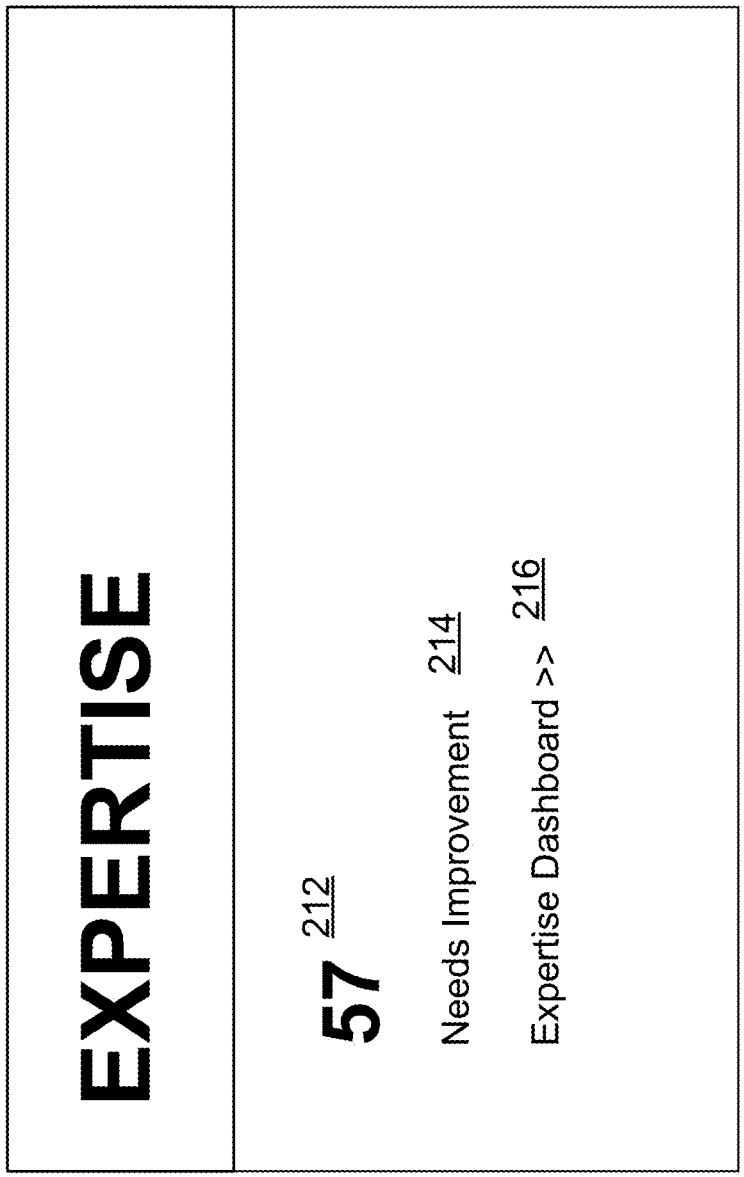
FIG. 7 shows the "expertise" section of the overview dashboard screen of FIG. 6.

FIG. 7 shows a view of the expertise section from FIG. 6. The overview dashboard content category sections show the most recent content score 212 and recommendation summary 214, if any. These may be limited to a certain period of time, so that scores and recommendations that are older than a threshold may not be shown. From each section, the user can review content dashboard for that section by clicking on the appropriate section dashboard link 216, or can initiate a content evaluation by clicking on the appropriate "add evaluation" link 218.

Figure 9:
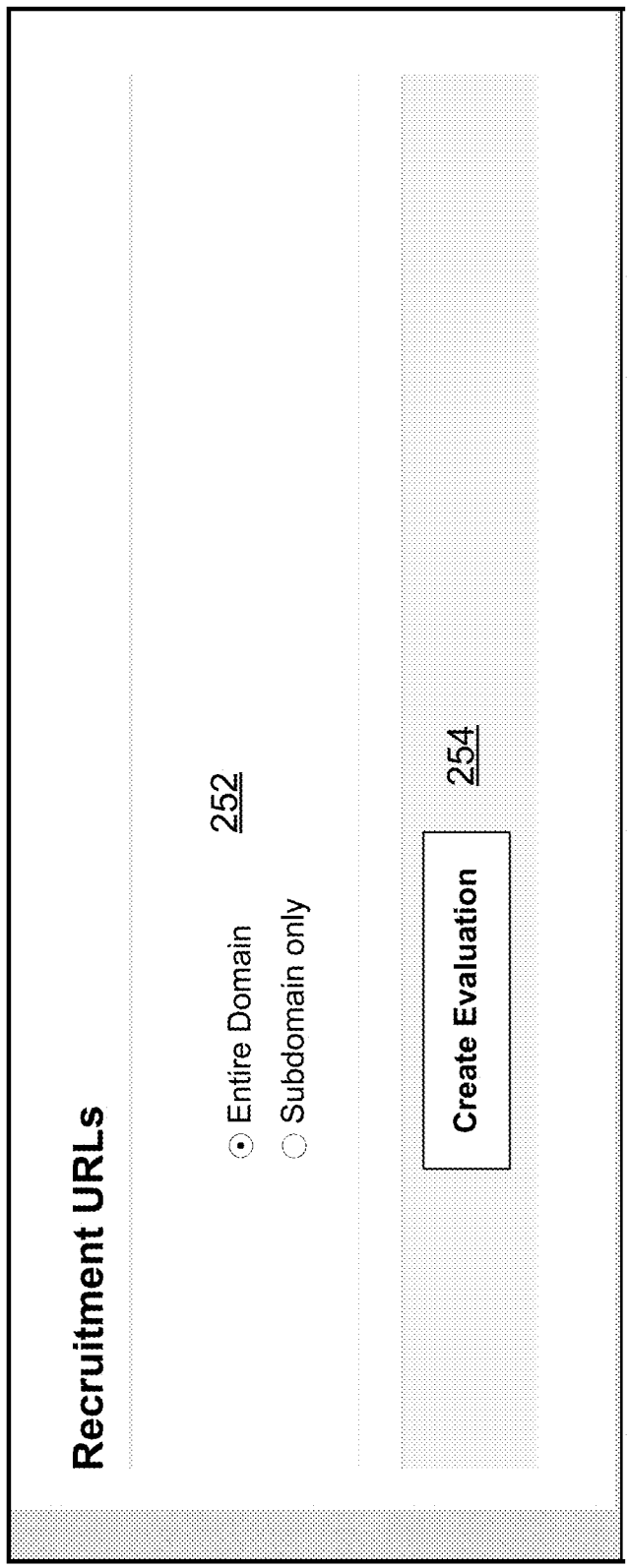
FIG. 9 shows an example of the recruitment URLs section of the new evaluation screen of FIG. 8.
Figure 10:
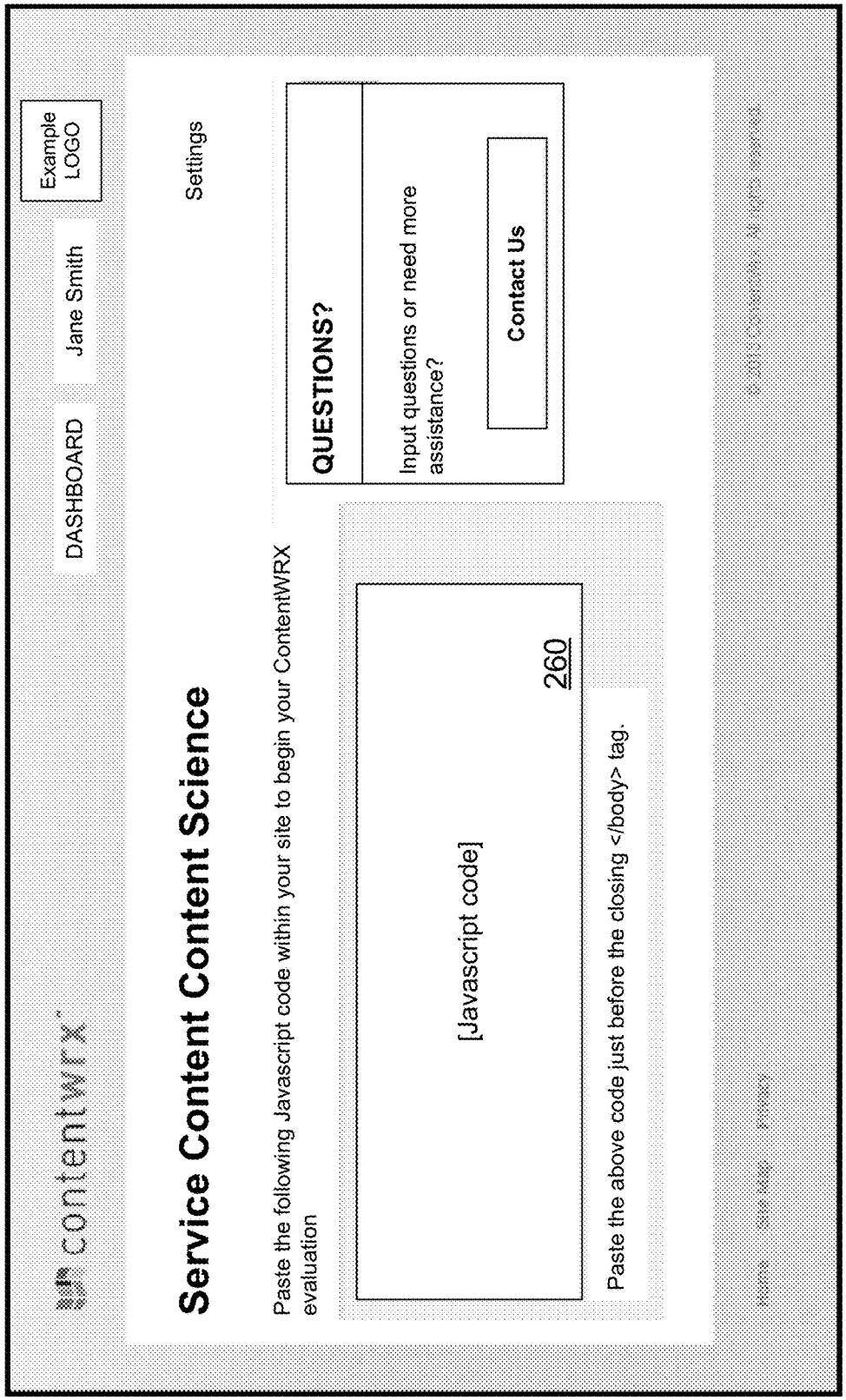
FIG. 10 shows an example of a Javascript code section for insertion into a web site file.

FIG. 8 shows an example of a new evaluation screen, where the user can select the type of content to be evaluated 250. If this screen is accessed through a content category section, that category will already be selected here. This screen also may accessed from other screens within the system. Under the "Recruitment URLs" section 252, the user may select the "entire domain" if he or she wants to evaluate the web site's content as a whole, or "subdomain only" if he or she wants to evaluate targeted content areas within the site (e.g., help section), as shown in FIG. 9. If the latter, the user is prompted to specify the subdomain part of the URL. The number of web sites or subdomains that may evaluated under each category may be unlimited, or limited to a certain number.

To proceed, the user then selects the "Create Evaluation" option 254. The user is then provided access to the JavaScript (or other suitable language) code 260 that displays the evaluation to the users as specified. The user copies and pastes the code into the web site HTML (or equivalent) code, typically just before the closing body tag.

Where results are available, clicking on the appropriate section dashboard link 216 opens the corresponding content evaluation dashboard (see FIGS. 11-16). If results are not available, an "evaluation in progress" screen, such as seen in FIG. 15, may be displayed. If results are available, this screen provides a summary of how well (or not) the web site's content is performing (see FIG. 16). This screen shows the content score for the current month 402, a score history graph 404, and industry comparisons (e.g., industry average) 406. Hovering the pointer over any point in the data plot will provide a pop-up window of information about that point, including how the score for that point compares to industry average score month by month. Clicking on the "How you compare" tab 408 provides more detail about how content performance compares to competition. The user can also view survey examples 410.

The dashboard also allows the user to view recommendations and supporting analysis by priority, by category, or by other measures, as seen in FIG. 11-14. The priority view is a subset of the full set of content recommendations, and focuses on the top ways to improve the web site's content, as well as any immediate fixes possible for content problems. The category view displays the full set of content recommendations. In either view, the recommendations may be organized by content category, such as content discovery 310 (i.e., finding, sharing, recommending, and remembering a web site), content accuracy 320 (i.e., content is consistent and accurate, contains references, citation or evidence), and content polish 330 (i.e., content is professional, easy to read and review).

Each content recommendation includes a reference to any data on which it is based. For examples, under content polish, the section recites that the data shows that 33% of the users think the site content is crowded and hard to read. As a result, the recommendation is to reformat the content to make it easier to read and use.

Figure 11:
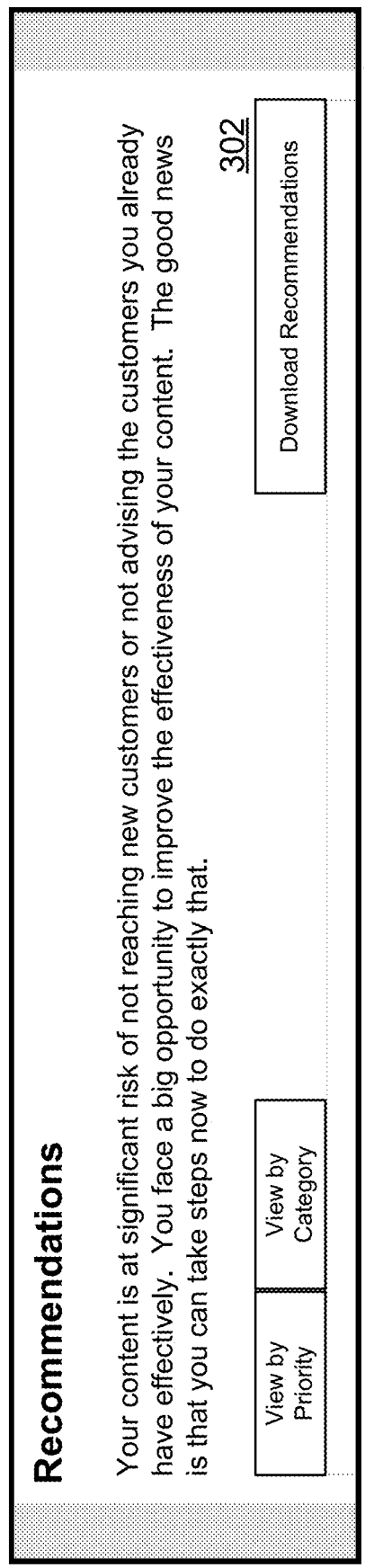
FIG. 11 shows an example of a recommendations summary.
Figure 14:
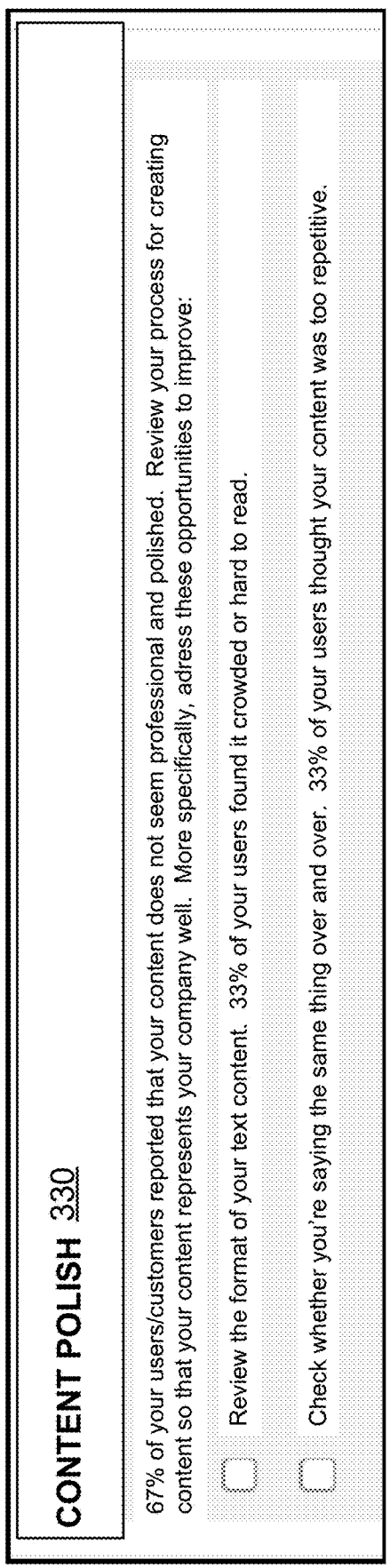
FIG. 14 shows an example of a content polish improvements screen.

Recommendations may be downloaded by the user in an appropriate format (e.g., PDF) for sharing or distribution, or later review, by clicking on the download link 302 in the category dashboard, as shown in FIG. 11.

In several embodiments, the system also uniquely assembles the survey data and the behavioral analytics for individual users or segments of users. This combines the data about what people think or perceive (i.e., survey responses) with what people do (i.e., behavior analytics), to provide full context for understanding whether content is effective. For example, if a page of thought leadership content receives a lot of traffic (as determined by page view analytics), but the survey data shows the content angered people, that probably would not be considered a successful result, unless the web site owner or operator was trying to provoke or attract attention (i.e., context). The present invention allows this data to be segmented by individual users or segments of users, thereby allowing web site owner or operator to prioritize their content improvement efforts. For example, a client may learn that their content was performing well for one segment of customers, and terribly for other customers. The client can then prioritize content adjustments for the latter segment.

Figure 17:
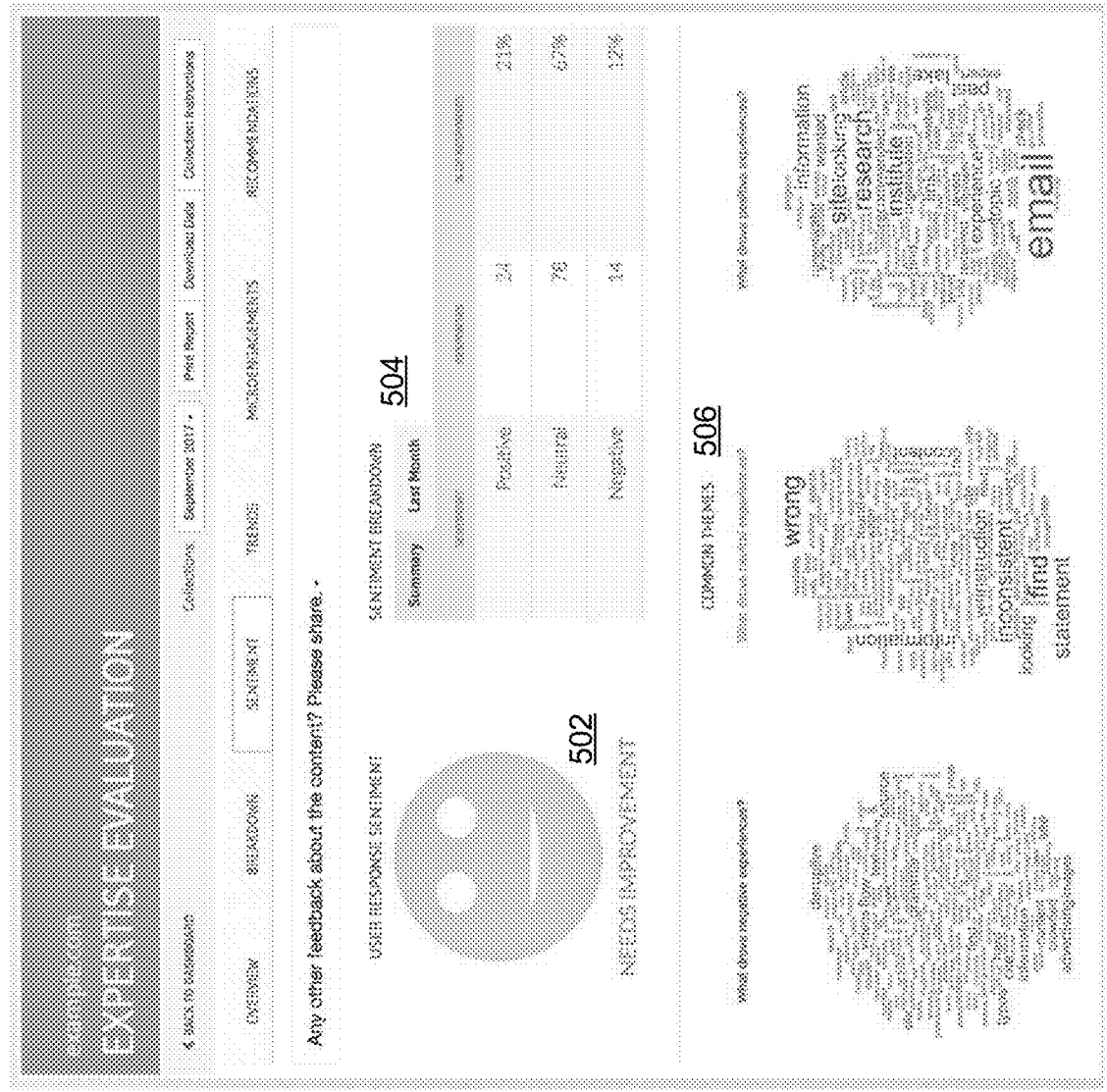
FIG. 17 shows an example of an expertise evaluation sentiment and theme analysis screen.

FIGS. 17-24 show additional examples of expertise evaluation summaries and reports. In various embodiments, the present invention analyzes open text data, and other information, to detect user sentiment or response (e.g., positive, neutral, negative). As seen in FIG. 17, a visual indicator (e.g., face or other symbol) 502 provides a simple indication of the overall user response sentiment. User sentiment can further be broken down by number/percentage of responses for each sentiment category, and can be view for particular time periods (e.g., month) or as a summary 504. One or more word cloud charts 506, which display how frequently certain words appear in a given sample of text, with relative word size and/or position based upon frequency (e.g., higher frequency of appearance results in a larger word size, and/or more central placement). Words may also be colored based on frequency, so that more frequently used words stand out. In the embodiment shown, word cloud charts are provided for common themes in the user responses, with a separate chart for each sentiment category.

The present invention also collects and analyzes micro-engagement data and information (i.e., the extent to which an individual user engages with and interacts with the technology and content of the website being analyzed). Micro-engagement data may include data regarding user micro-interactions. Micro-interactions encompass many everyday interactions between humans and computer system, and provide feedback to the user, such as providing system status or error correction, and can be used as a form of branding. More generally, micro-interactions include trigger-feedback pairs, wherein the trigger can be a user action or a system state change, the feedback is narrowly targeted in response to the trigger, and the feedback is communicated through small, contextual changes (visual and/or textual) in the user interface. Micro-interactions are an important detail in website design, and well-designed micro-interactions can make a website exception by improving website navigation, providing quick and relevant feedback, providing guidance and direction to users, and encouraging user interaction and enhancing user engagement with the website.

Figure 18:
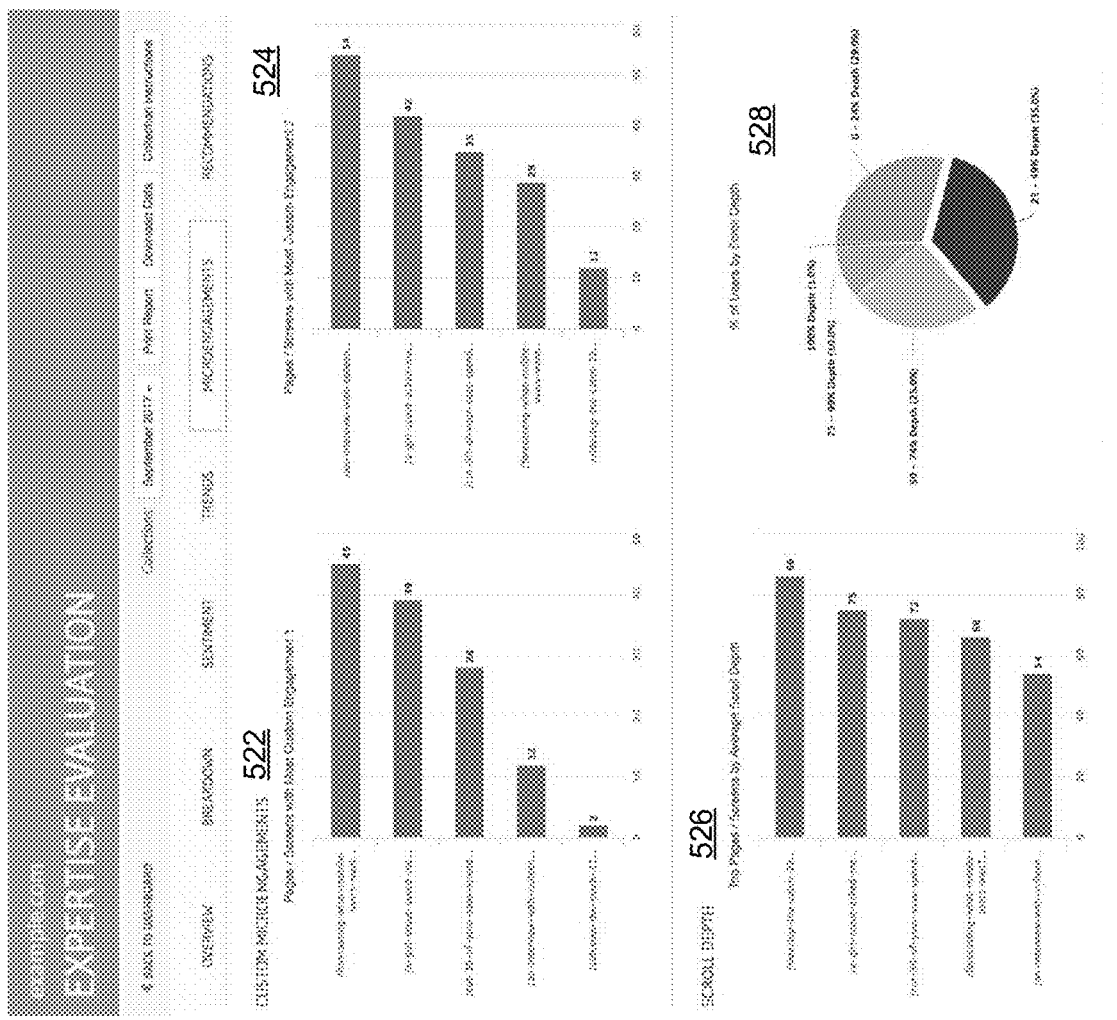
FIG. 18 shows an example of an expertise evaluation micro-engagements analysis screen.
Figure 19:
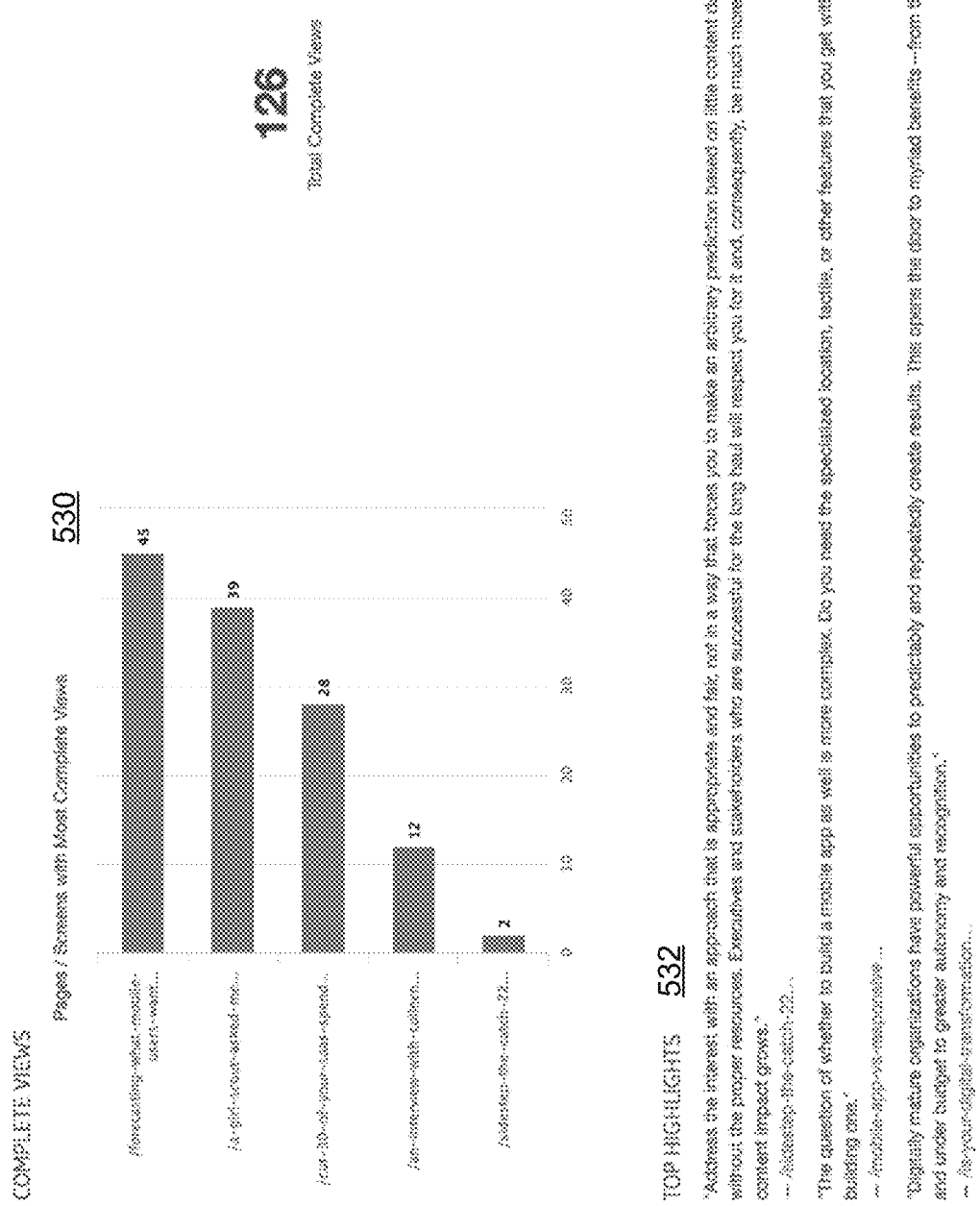
FIG. 19 shows an example of a portion of an expertise evaluation micro-engagements analysis screen with percentage of complete view and top highlights.
Figure 20:
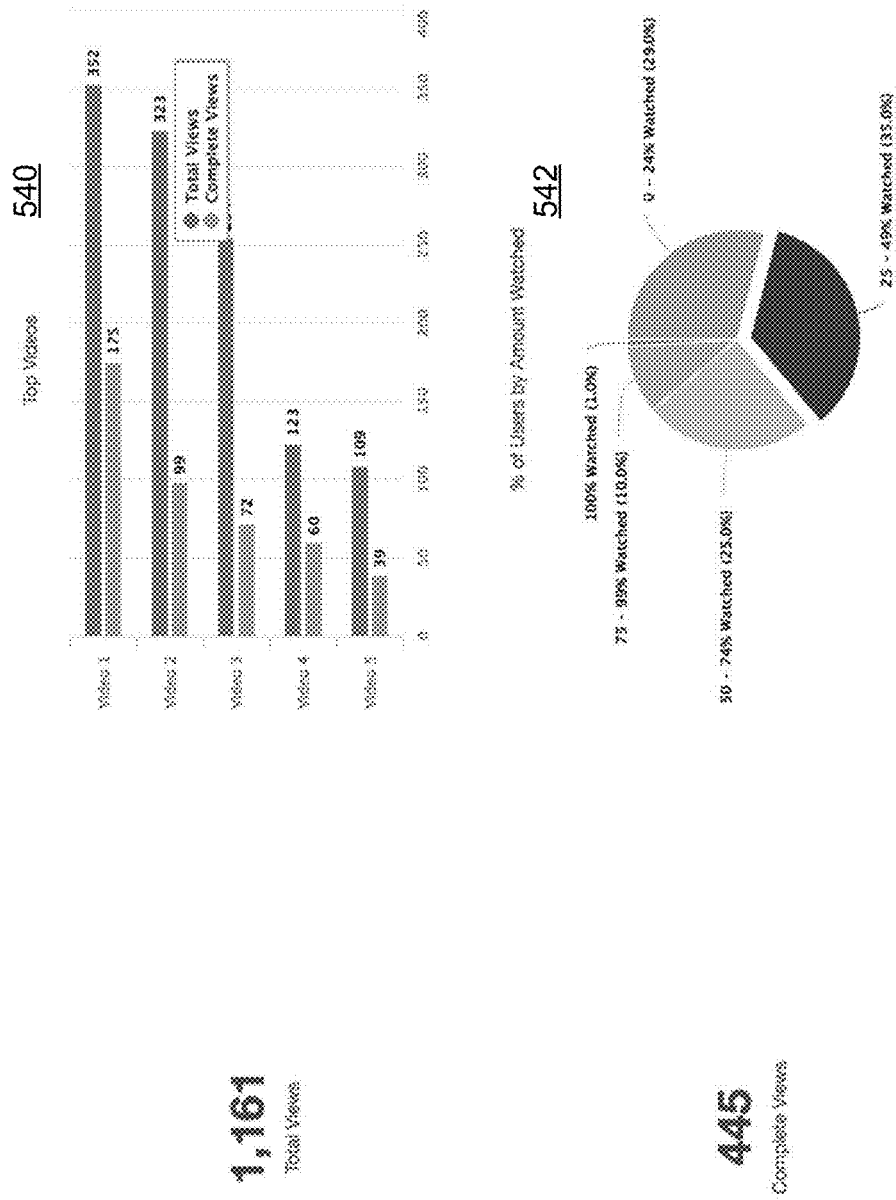
FIG. 20 shows an example of a portion of an expertise evaluation micro-engagements analysis screen for video engagements.

FIG. 18 shows a summary of micro-engagement data. Charts 522, 524 show a breakdown of pages/screens by particular type of custom micro-engagement. A scroll-depth chart 526 shows pages/screens by average scroll depth (i.e., how far a user scrolls down a page, in %). A scroll-depth pie chart 528 shows the percentage of users for certain ranges of scroll depth (e.g., 1.0% of users scrolled down 100% of the page). Similarly, FIG. 19 shows a chart 530 of the pages/screens by number of complete views (i.e., viewed the entire page/screen), and a listing of top highlighted content 532 from some pages/screens. FIG. 20 shows an example of a summary of video engagements, with a chart 540 of total views and complete views (i.e., viewed the entire video) by video, and a pie chart 542 showing the percentage of users by the amount (which can be in a range, e.g., 0 to 24% watched) watched.

Figure 21:
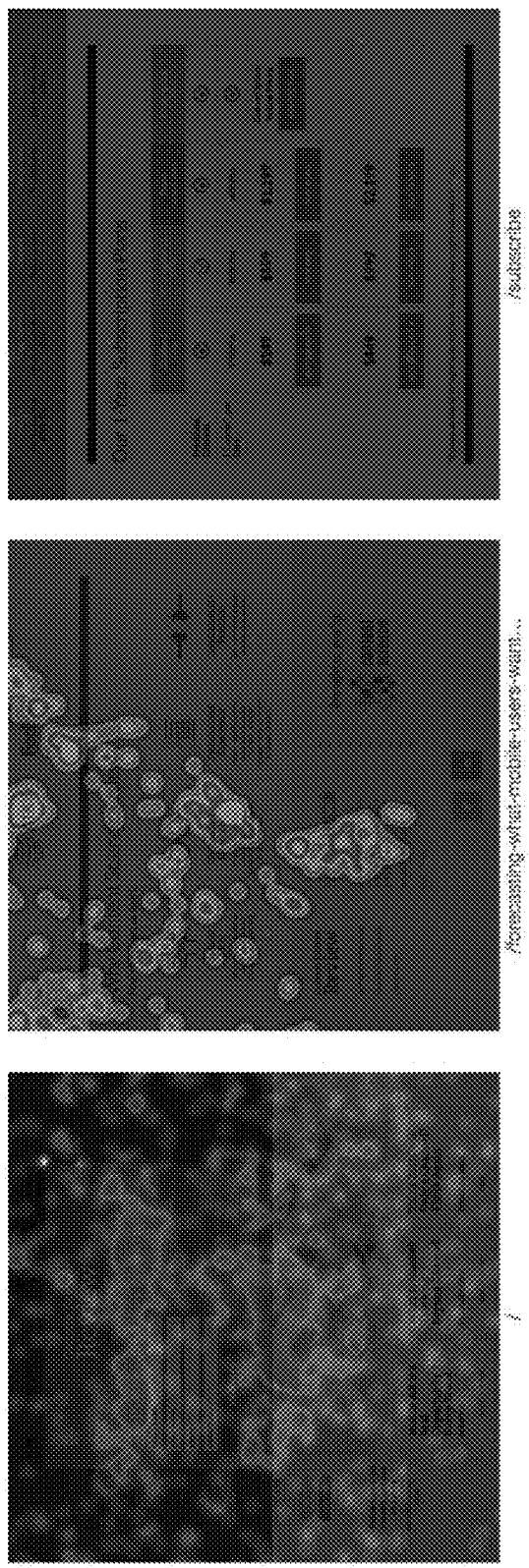
FIG. 21 shows an example of a portion of an expertise evaluation micro-engagements analysis screen with heatmaps for page interaction.

FIG. 21 shows a gallery of heatmaps 550 for selected page/screens on the website. A website heatmap is a data visualization of user interaction (such as clicks, taps, mousing movements) on a website page or screen, typically in color, with the greater number of interactions shown in a brighter color (e.g., red) with the least frequented parts in a cooler color (e.g., blue). This visual format shows the parts of the page or screen that attracted the most user/visitor attention or interest.

Figure 22:
FIG. 22 shows an example of an expertise evaluation page-level breakdown report.
Figure 23:
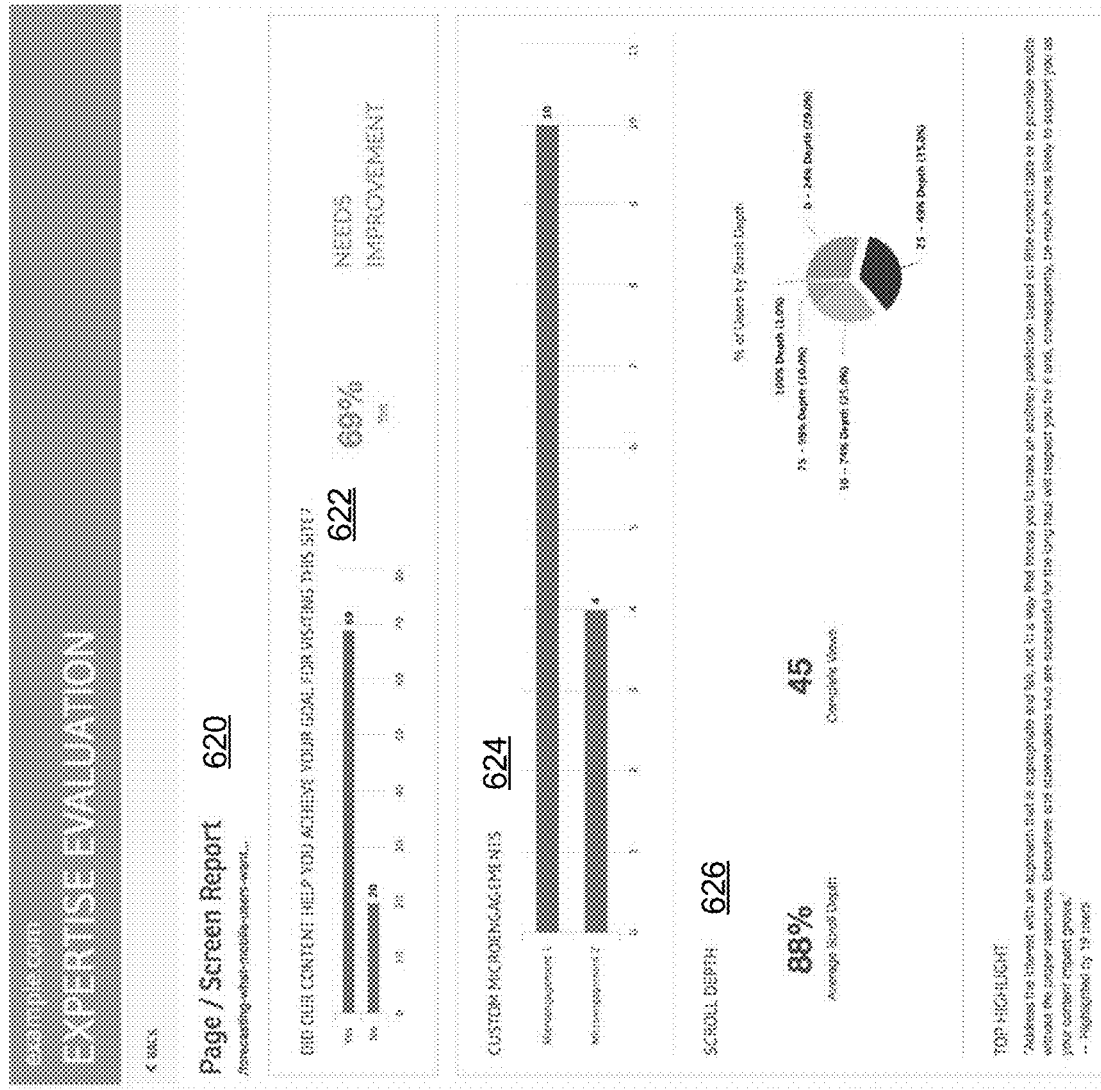
FIG. 23 shows an example of a portion of an expertise evaluation detailed page/screen report.

FIG. 22 shows an page/screen summary table 600, listing the score for the page/screen, the percentage of respondents, and visual indicators (positive, neutral, and negative) by certain categories (discovery, accuracy, relevancy, usefulness, polish, and influence). Selecting the "View Report" option 620 for a page/screen opens a detailed page/screen report (as seen in FIGS. 23 and 24) for that page/screen. This provides details about user responses to questions 622, the number and usage of types of micro-engagements 624, scroll depth 626, top highlights 628, video engagement charts 630, 632, and heatmaps 634.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine for evaluating web site content, comprising:
a processor or microprocessor coupled to a memory, wherein the processor or microprocessor is programmed to:
receive a URL for a web site or a portion of a web site to evaluate;
monitor visitor interaction with the web site or portion of the web site;
determine whether to send particular visitors invitations to participate in a content evaluation survey for the content on the web site or portion of the web site based upon a set of visitor interaction triggers, wherein the interaction triggers include the type of visitor device and the length of time of particular visitor interaction;
send electronic invitations to said particular visitors to participate in the content evaluation survey;
initiate the content evaluation survey with said particular visitors who accept the invitation, wherein the content evaluation survey comprises questions divided into multiple content types, including
a first content type addressing the level of knowledge demonstrated by the content on the web site or portion of the web site,
a second content type addressing sales,
a third content type addressing service,
a fourth content type address support, and
further wherein each content type comprises multiple elements, including a first element addressing the extent to which the content can be found and/or discovered by a user, and a second element addressing accuracy and polish of the content;
collect electronic survey responses to the content evaluation survey;
calculate a type content score for each type of the content evaluation survey by applying different weights to different electronic survey responses, where the weights depend on the type of content;
calculate a composite content score for the content on the web site or portion of the web site by applying different weight to the type content scores;
determine an overall response sentiment indicator to the level of knowledge demonstrated by the content based on analysis of open text data; and
determine micro-engagement data indicating the extent to which a particular visitor engages with and interacts with the web site being analyzed.

2. The machine of claim 1, further wherein the processor or microprocessor is further programmed to:
modify the type content scores by applying different weights to different analytical measures for the web site or portion of the web site.

3. The machine of claim 1, wherein the content scores are calculated for a period of time.

4. The machine of claim 3, wherein the period of time is a month.

5. The machine of claim 1, wherein the number of survey responses is capped.

6. The machine of claim 1, further wherein the processor or microprocessor is further programmed to:
display the content score;
provide a graphical comparison of the content score for the current period of time to content scores for previous periods of time; and
provide a graphical comparison of the content score for the current period of time to industry average scores for similar content.

7. The machine of claim 1, further wherein monitoring the visitor interaction with the web site or portion of the web site comprises recording the location and duration of engagement by the visitor with one or more portions of the web site.

8. The machine of claim 7, wherein recording the location and duration of engagement includes the recording the movement of a pointer or mouse indicator on the one or more portions of the web site.

9. The machine of claim 1, further wherein monitoring the visitor interaction with the web site or portion of the web site comprises recording the depth the visitor scrolls down one or more portions of the web site.

10. The machine of claim 1, further wherein monitoring the visitor interaction with the web site or portion of the web site comprises recording the amount of a video that the visitor watches in one or more portions of the web site.

* * * * *